United States Patent [19]

Duval

[11] Patent Number: 4,663,499
[45] Date of Patent: May 5, 1987

[54] METHOD FOR TRANSMITTING MESSAGES BETWEEN A CENTRAL STATION AND SEVERAL DISTANT STATIONS

[75] Inventor: Claude Duval, Boulogne, France

[73] Assignee: La Detection Electronique Francaise-Protecbat, Vanves, France

[21] Appl. No.: 845,311

[22] Filed: Mar. 28, 1986

Related U.S. Application Data

[63] Continuation of Ser. No. 638,937, Aug. 9, 1984, abandoned.

[30] Foreign Application Priority Data

Aug. 19, 1983 [FR] France ............................... 83 13503

[51] Int. Cl.⁴ ............................................. H04Q 9/16
[52] U.S. Cl. ....................................... 178/2 R; 375/36
[58] Field of Search ...................... 178/2 R, 69.6, 2 A, 178/2 C; 340/310 R, 870.01 R; 375/22, 23, 36

[56] References Cited

FOREIGN PATENT DOCUMENTS 2521388 11/1976 Fed. Rep. of Germany .
2377611 8/1978 France .

Primary Examiner—Stafford D. Schreyer
Attorney, Agent, or Firm—Sughrue, Mion, Zinn, Macpeak and Seas

[57] ABSTRACT

A method for transmitting a message by a two way wire connection between a central control and survey station (1) and several remote detection stations (3A–3N) adapted to generate a signal representative of at least one parameter of its environment, particularly for the monitoring of buildings, during which the central station (1) successively generates addresses assigned to each of the remote stations (3A–3N), these latter in response to the reception of this address emitting a message characteristic of the value of the corresponding environment parameter, characterized in that said addresses are generated by the central station (1) by modulation of a continuous voltage permanently applied to said telegraphic connection, and in that each remote station (3A–3N) transmits its message by amplitude modulation of the current on said line by application of said voltage to said line.

17 Claims, 7 Drawing Figures 4,663,499

METHOD FOR TRANSMITTING MESSAGES BETWEEN A CENTRAL STATION AND SEVERAL DISTANT STATIONS

This is a continuation of application Ser. No. 638,937, now abandoned, filed Aug. 9, 1984.

This invention relates to the transmission by a wire connection between a control and surveillance station and several remote stations in regard to messages which illustrate the status at the location of each remote station. A method and an apparatus utilizing such a transmission can be applied in regard to security surviellance of buildings, and similar.

At present, the exploitation of a large building, a factory, or a group of factories has become complex. The cost of personnel, being substantial, has rendered it indispensible that there be grouped at a single central monitoring station, and in a simple form, all of the information and control capabilities relating to security.

For the transmission of messages between a central monitor station and various remote stations, it is known to use connections for directing useful signals and for line survey. For example, a known method uses a normalized current loop of 20 mA. A dialog between the central station and the remote stations requires therefore a four wire cable and appropriate equipment mounted at the ends of the cable, but this device is not sufficient in itself. It is also necessary to have an power line for supplying the terminal equipment. The number of wires needed therefore is six and the connecting of the elements of the device into the building is difficult and involves substantial costs.

This invention has as an object a method and apparatus for avoiding these drawbacks and which considerably reduces the installation difficulties of a security system in a building.

There is provived a method of transmitting messages by wire connection between a central monitor station and several remote detection stations adapted to produce a signal representative of at least one parameter of the evironment, in particular for the monitoring of buildings, during which the central station (1) successively generates the addresses assigned to the remote stations (3A-3N), and these stations in response to the reception of this address emit a message characteristic of the value of the corresponding environment parameter, characterized in that said addresses are generated in the central station (1) by modulation of a clock signal supported by a continous voltage permanently applied to said wire connection, this continous voltage also constituting the power supply voltage of the distant stations, and in that each remote station (3A-3N) transmits its message to the central station by modulation at the rate of the clock signal of the current circulating on said line, by applying said voltage to the line.

Because of these characteristics, there can be utilized a simple shielded cable connection having two wires of the type usually used by some telephone authorities for telephone connections, this cable being adapted to transmit both dialog signals between the stations and the power supply for the remote stations and thus these stations need not have their own power supplies.

There is also provided a device for carrying out the above method.

Other characteristics and advantages of the invention will appear in the course of the following description, which is only an example.

Figure 1:
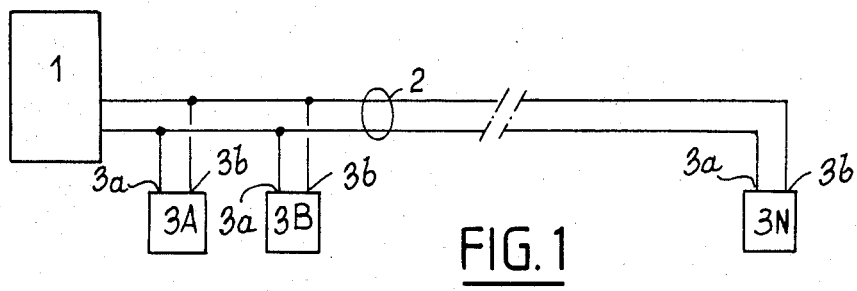
FIG. 1 is a very simplified diagram of a survey system according to the invention.

FIG. 1 shows very schematically a surveillance or survey installation according to the invention. A survey and control station is placed at a strategic location in a building whose security is to be assured (building, factory, ship, etc.) and is connected to a transmission line 2 which is a simple shielded two wire cable used by the French Telephone Authority (P.T.T.) for local telephone connections. Remote stations (3A-3N), which are placed at the locations to be monitored, are connected to the transmission line 2 by two leads $3a, 3b$.

Figure 2:
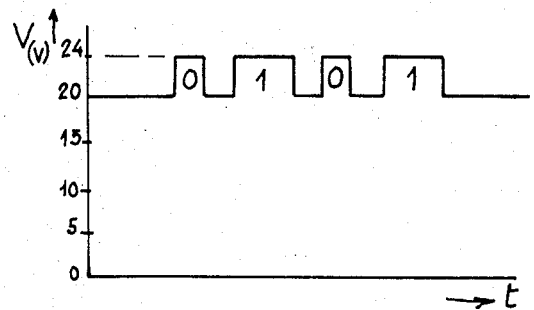
FIG. 2 shows a wave form of the voltage at the wire connection between the central and remote stations for the addressing of these latter.
Figure 3:
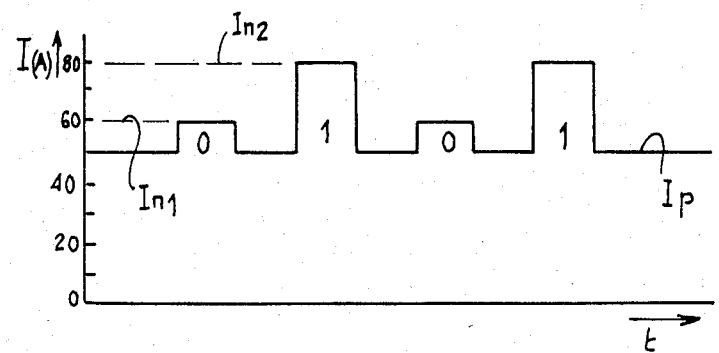
FIG. 3 shows the wave form of the current circulating on the wire connection from the remote stations towards the central station for the transmission of messages.

FIGS. 2 and 3 show the form of the signals on the transmission line during the exchange of information between the survey and control station 1 and the stations 3A and 3B.

In the direction from the central station to the remote station, the transmission line 2 has a continous voltage which can vary between two levels (20 and 24 volts, for example), this voltage being modulated to transmit the binary signals 0 and 1 which constitute the addresses of the stations 3A to 3N.

In the example here described, the continous voltage applied on line 2 is pulse width modulated, the address represented in FIG. 2 as an example being 0101. Of course, other types of modulation are possible within the scope of the invention.

In the opposite direction, that is when a message must be transmitted from a remote station to the survey and control station, a current traverses line 2, this current having a constant value Ip of 50 mA, for example, on which is superimposed an amplitude modulation varying between two levels In1 and In2. The lower level, which can be set at 60 mA, for example, can represent a bit 0 while the upper level which be 80 mA, for example can represent the bit 1.

In FIG. 3 there is represented as an example the binary signal 0101.

The current thus modulated results in a voltage which is applied to line 2 during the message transfer from a remote station 3A-3N addressed at a particular moment, the circuit in the remote station being capable, according to the state of the parameters detected by this station at the location being monitored, to generate the amplitude variations such as represented in FIG. 3. Thus the remote stations need no autonomous supply and do not load the line to a substantial extent except when the central station 1 addresses them. This addressing can be periodically effected according to a predetermined program executed in the control station, the addresses of the remote stations 3A-3N being successively emitted according to a predetermined cycle, which is itself periodically repeated. For example, the central control station 1 can address and receive a remote station each millisecond. Of course, the value of the permanent current depends upon the number of the remote stations connected to the line, this number can vary to a fairly large degree, a number of 100 stations being practical.

Line 2 is preferably twisted and shielded for a good immunity against noise. As will be seen, each remote station behaves on the line as a shunt resistance which, in absorbing a part of the parasitic power transmitted on the line, additionally augments the immunity against noise.

Figure 4:
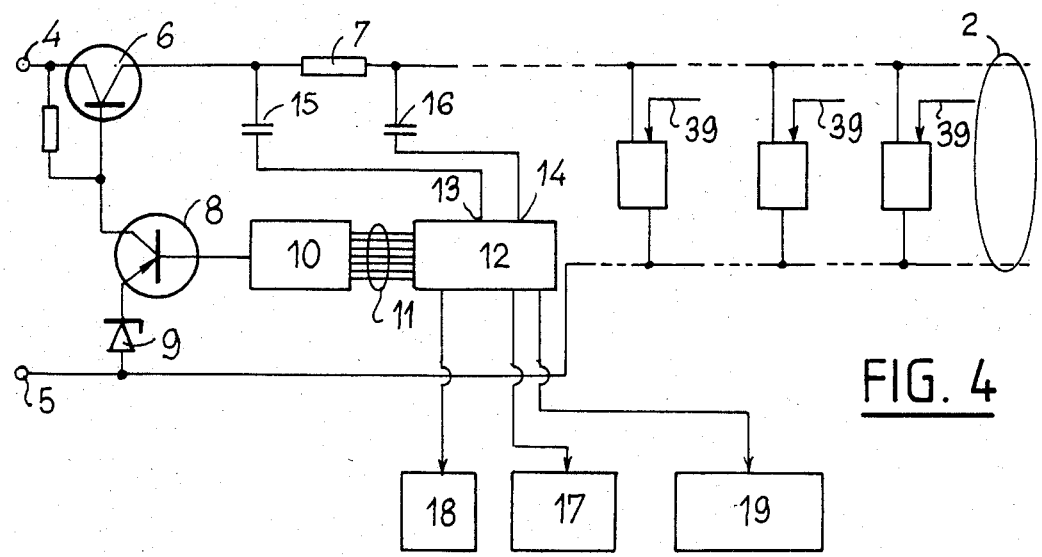
FIG. 4 shows a simplified diagram of the central survey and control station.

FIG. 4 shows a diagram of the survey and control station 1. This control station has two supply terminals 4 and 5. Terminal 4 is connected through the collector-emitter path of power transistor 6 adapted to effect the modulation of the voltage on line 2 to one of the leads of line 2. Series resistor 7 is connected between this transistor and line 2 for allowing the measurment of the current on this line. Transistor 6 is controlled by control transistor 8, the emitter bias of which is determined by Zener diode 9 connected to terminal 5 and the other conductor of line 2. The base of control transistor 8 is connected to the output of parallel-serial converter 10 which, by bus 11, is connected to the output of processing and control circuit 12 which is preferably a properly programmed micro-processor.

The control circuit has two inputs 13 and 14 which, by capacitors 15 and 16, are connected to the two terminals of series resistor 7 for transferring the current levels of line 2 to the micro-processor 12. This processor is connected to visualization console 17, printer 18, and optionally to display 19 which can represent by luminous signals, for example, the implantation of remote stations 3A-3N in the form of a topographic representation of the building so that it can be easily interpreted by the survey personnel.

Figure 5:
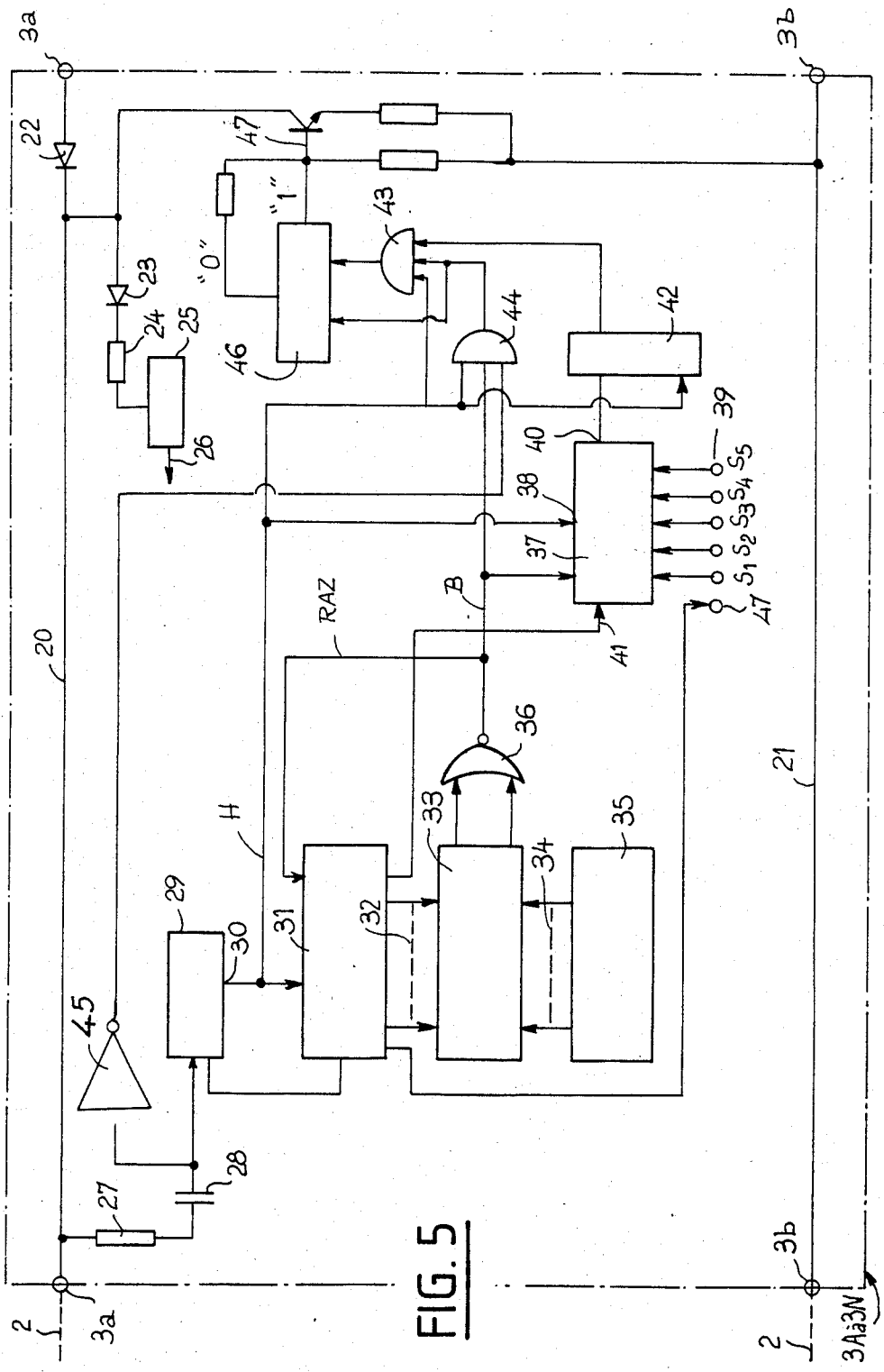
FIG. 5 is a simplified diagram of a distant or remote station.

FIG. 5 shows a simplified diagram of one of the remote stations (3A-3N). Line 2 is connected to terminals 3a and 3b which are connected to two conductors 20 and 21 between which is connected the remote station assembly. Terminal 3a is connected by diode 22 to line 20 and this latter is connected by another diode 23 and a series resistor 24 to supply circuit 25 which produces on output 26 the supply voltage necessary for the circuits of the remote station. Circuit 25 can include a voltage stabilizer and other known circuits providing a stable supply voltage to the station's circuits.

The conductor 20 is connected by resistor 27 and capacitor 28 to a clock oscillator 29 which produces a clock signal of 32 kHz, for example, at output 30, the supply being provided by the average input voltage from control station 1 and which is synchronized on the leading edges of the input signals, these being emitted by the central station at an average frequency of 1000 Hz, for example.

Oscillator 29 controls shift register 31 adapted to store the addresses of the remote station upon their reception by the central station. This shift register has outputs 32 connected to the first inputs of comparator 33 which receives on its other inputs the output 34 of internal code generator 35. This generator, the structure of which is permanently set at the time of installation of the distant station, stores in memory the address of this station which is then compared in comparator 33 with the address stored in shift register 31. The outputs of comparator 33 are applied to gate 36 which produces a signal only when the address stored in register 31 corresponds to that held in the memory of internal code generator 35. The output of this gate 36 is also connected to exploitation register 37 which receives the clock signal of oscillator 29 at terminal 38 and which is connected to a number of scanning inputs 39, numbered S1-S5. This register 37, which is a shift register, transfers the information which is applied to it to its output 40 by means of a control signal applied to terminal 41 from shift register 31. Thus register 37 is capable not only of providing on its output terminal 40 the address recognized by the comparator 33 but also the state of the terminals S1-S5 by successively shifting the corresponding pluses to its output under control of clock 38.

Output 40 of shift register 37 is connected to flip-flop 42 which is synchronized on the clock signal and its output is connected to one of the inputs of AND gate 43. The second input of this gate 43 is connected to the output of another AND gate 44 which enables gate 43 only upon the simultaneous reception of three enabling signals, one being the clock signal, the second being the signal provided by NOR gate 36 and which therefore indicates the recognition of the address of the remote station under consideration, the third being the synchronizing signal which is applied through invertor 45 connected to capacitor 28. This latter signal is therefore synchronous with the pulses coming to the remote station from central station 1.

Gate 43 is also enabled by the clock signal from oscillator 29.

The outputs of gates 43 and 44 are respectively applied as control signals to power circuit 46 which is adapted to control a power transistor 47, the base of which is directly connected to this circuit to receive the binary 1 signals and indirectly through resistance 47 for the binary 0 signals. The signals 1 and 0 are selectively generated when gate 43 or gate 44 transfers an output signal to power circuit 46.

The emitter-collector circuit of transistor 47 is connected between the terminals 3a and 3b and thus modifies the impedance between these two conductors as a function of the control state of its base.

In other words, when transistor 47 is controlled, the current on line 2 produced by the voltage applied thereto by the central station will be modified at the frequency of the control of this base in accordance with the waveform of FIG. 3.

The terminals 39 can be connected to devices external to the remote stations. These can be, for example, a fire detector, a thermometer, or another detection device which monitors the situation on location. The remote station also includes an output terminal 47 which, in conformance with a binary signal which can be a part of the message sent at the same time by the central station with the address of the remote station under consideration, can trigger an external action, (for example, the opening of a trap, the control of a valve, or other similar action) at the station in question.

Figure 6:
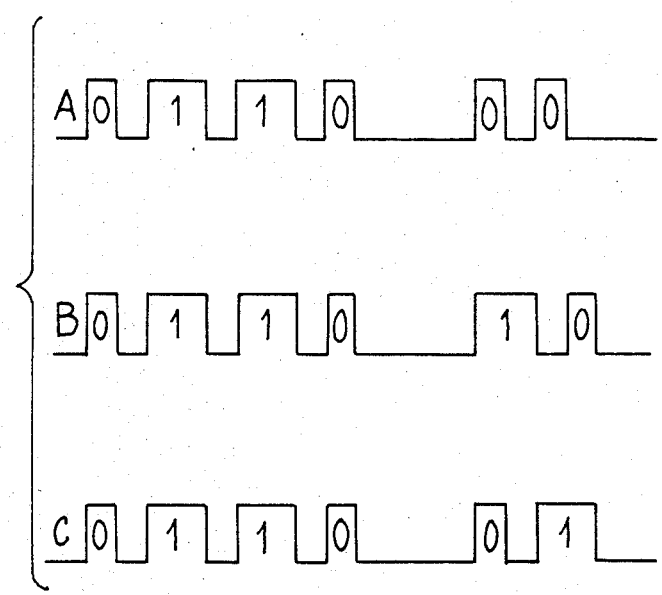
FIG. 6 shows several wave forms for the device according to the invention.

The operation of the installation is as follows:

In FIG. 6, it is supposed that the distant station has the address 0110 and that at the moment considered, this address is sent in the form of a modulated voltage by the central station on line 2. The address, being recognized in the remote station by comparator 33, this latter authorizes register 37 to transform the information taking into account the state of terminals 39. In the FIG. 6 example, it is assumed that the remote station has only two terminals 39. "A" of FIG. 6 indicates that the remote station controls its transistor 47 so that first its address is sent on line 2, then the state of terminals 39 (S1 and S2, for example). In the case represented at "A", these terminals are not activated. In these conditions, the register only receives the binary signals 0, which is interpreted by central station 1. In the case "B", it is supposed that terminal S1 is activated, for example, because a fire dedector has determined an excessive increase in temperature at the remote station. In these conditions, the remote station emits first of all its address, then a binary signal constituted by a high pluse signal 1 then a low pluse signal 0. "C" shows the inverse case where it is terminal S2 which has been activated.

As indicated above, the survey of all of the remote stations can be effected by a systematic scanning of the stations, the micro-processor 12 of the central station 1 sending a series of addresses on the line and all of the remote stations sending a message to the central station upon the reception of their address. In the case shown, the address is made up of four bits but the number is, of course, not limiting, a number of eight pulses being preferable which provides a maximum of 256 addresses. When the remote station sends the return message, the modulated current is detected by resistor 7 and micro-processor 12 which transforms the message thus received for display or other interpretation by devices 17 to 19 seen in FIG. 4. For example, the micro-processor can first verify the address and then effect an appropriate operation by its program. If the address is accurate, nothing happens, and if the address is erroneous, the defect is indicated on the visulation console, with the hour, the date, and the number of the remote station having the error. It is possible to have supplementary information relating to the state of the terminals 39 of the remote erroneous station displayed in clear language on the visualization device. The device 19 can also take this situation into account by illuminating a warning light, for example.

Of course, if an instruction must be executed at the remote station, the address of the station is followed by a pluse which is translated by the terminal 47 of the remote addressed station.

The combination of the addresses and the control pluses at reception as well as emission, allows an appropriate program to effect complete sequences such as the reading of a fire detection alarm, then the automatic or manual control, by keyboard, of an extinguisher, the reading of a liquid level, the closing of a supply if a liquid store is over-full, or analogous action.

Figure 7:
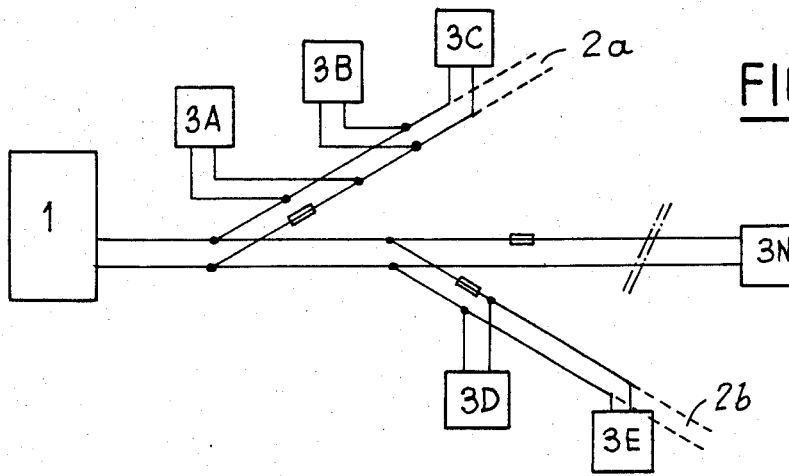
FIG. 7 shows another arrangement of the device according to the invention.

FIG. 7 shows a variation of the implantation of the remote stations. Line 2 here includes parallel branches 2a and 2b to which are connected various remote stations. It is therefore seen that the particular arrangement according to the invention allows great flexibility in the choice of the implantation of the remote stations in using simple shielded wire cables.

What is claimed is:

1. A method of transmitting messages by wire connection between a central station and several remote stations adapted to generate a signal representative of at least a parameter of the environment at the remote station, in which the central station successively generates addresses assigned to each of the remote stations including the step of generating the addresses in the central station by modulation of a periodic signal having a frequency, said periodic signal being added to a continuous voltage permanently applied to said wire connection, this continuous voltage constituting also a supply voltage of the remote station, and the step that each remote station transmits its message to the central station by modulation at the frequency of the periodic signal on said line by modifying the impedance thereof.

2. A method according to claim 1 wherein said periodic signal is pulse width modulated.

3. A method according to claim 2, including selectively sending control signals on the line following addresses of at least one of the remote stations, and in causing, in the remote station addressed, an action following the reception of the control signals accompanying the address of this station.

4. A method according to claim 3 including cyclically generating the addresses of all of the remote stations, each addressing cycle consisting in successively addressing all of the remote stations and receiving from them a message.

5. A method according to claim 2 including cyclically generating the addresses of all of the remote stations, each addressing cycle consisting in successively addressing all of the remote stations and receiving from them a message.

6. A method according to claim 1 including selectively sending control signals on the line following addresses of at least one of the remote stations, and in causing, in the remote station addressed, an action following the reception of the control signals accompanying the address of this station.

7. A method according to claim 6 including cyclically generating the addresses of all of the remote stations, each addressing cycle consisting in successively addressing all of the remote stations and receiving from them a message.

8. A method according to claim 1 including cyclically generating the addresses of all of the remote stations, each addressing cycle consisting in successively addressing all of the remote stations and receiving from them a message.

9. An apparatus for transmitting messages by wire connection between a central station and several remote stations each adapted to generate a signal representative of a parameter of the environment at the remote station, comprising: a central station and remote stations, said central station being equipped with means for displaying messages sent to the central station by the remote stations, said central station and said remote stations being connected by a line to which the remote stations are connected, the central station being provided with means for adding a modulated periodic signal to a constant supply voltage applied to the line, said modulated periodic signal representing addresses for said remote stations, means connected in parallel with said line for modulating the amplitude of a current on said line by modifying the impedance thereof at the frequency of the periodic signal as a function of detection signals generated by the remote station for representing the parameters monitored at the location of the remote station.

10. An apparatus according to claim 9 wherein the central station includes a controlled semiconductor component connected with the line and a voltage source and in that the semiconductor component is connected to a control circuit adapted to modulate the voltage applied to the line.

11. An apparatus according to claim 10 wherein the means connected in parallel on the line at each remote station includes a controlled semiconductor component of which the path of principal conduction is connected between the conductors of said line, the conduction of the path being modified as a function of the signals generated in the remote station.

12. An apparatus according to claim 10 wherein said control circuit includes a micro-processor for effecting addressing cycles during which addresses are generated for controlling the conduction of the semi-conductor component for the modulation of said voltage.

13. An apparatus according to claim 12 wherein the means connected in parallel on the line at each remote station includes a controlled semiconductor component of which the path of principal conduction is connected between the conductors of said line, the conduction of the path being modified as a function of the signals generated in the remote station.

14. An apparatus according to claim 9 wherein the means connected in parallel on the line at each remote station includes a controlled semiconductor component of which the path of principal conduction is connected between the conductors of said line, the conduction of the path being modified as a function of the signals generated in the remote station.

15. An apparatus according to claims 14, 11 or 13 wherein each remote station is provided with a comparator having a first set of inputs connected to a first memory for storing each address which is sent by the central station, the comparator having a second set of inputs connected to a read only memory which maintains a binary code characteristic of the remote station concerned, and having an output connected to the control circuit for enabling the control circuit when the address sent corresponds to the binary code stored in said read only memory.

16. An apparatus according to claim 15 wherein there is provided in each remote station, a second memory for storing the binary state of at least one input on which can appear a signal representing the environment and wherein the output of this second memory is connected to the control circuit for transmission to the control circuit when said enabling signal is received.

17. An apparatus according to claim 16 wherein the first and second memories are shift registers connected in series to said control circuit and to an internal clock oscillator synchronized on the periodic signals of the line.

* * * * *